(No Model.)
L. O. DION.
MEANS FOR SUPPLYING MOTIVE POWER TO CARS OR OTHER VEHICLES.
No. 461,895. Patented Oct. 27, 1891.
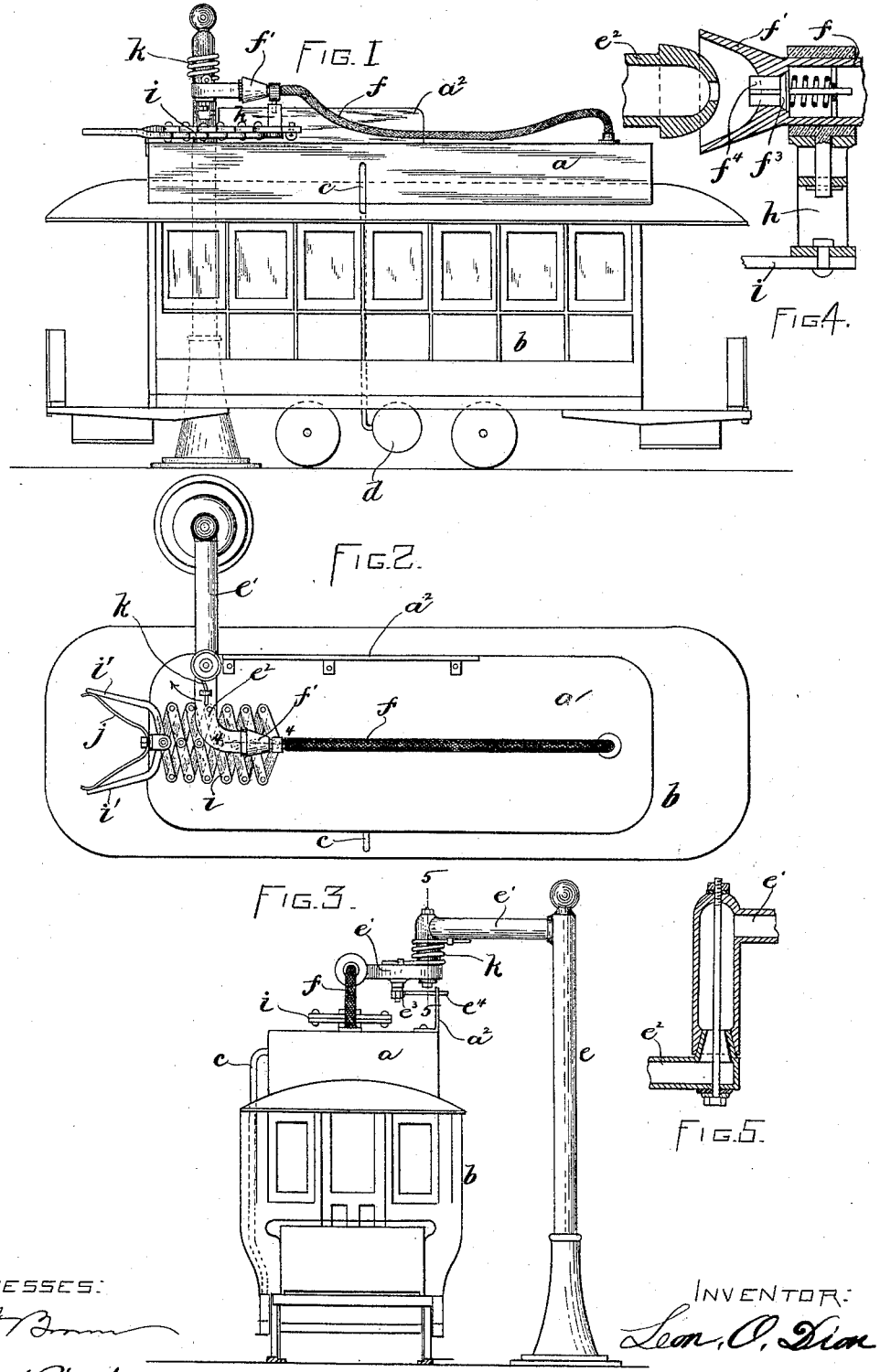
WITNESSES:
INVENTOR:
Leon. O. Dion

UNITED STATES PATENT OFFICE.

LÉON O. DION, OF NATICK, MASSACHUSETTS.

MEANS FOR SUPPLYING MOTIVE POWER TO CARS OR OTHER VEHICLES.

SPECIFICATION forming part of Letters Patent No. 461,895, dated October 27, 1891.

Application filed January 19, 1891. Serial No. 378,322. (No model.)

*To all whom it may concern:*

Be it known that I, LÉON O. DION, of Natick, in the county of Middlesex and State of Massachusetts, have invented certain new and useful Improvements in Means for Supplying Motive Power to Cars and other Vehicles, of which the following is a specification.

This invention has for its object to provide an improved method of and means for supplying moving cars with motive power which may be in the form of compressed air, steam, electricity, or any other agent adapted to impel a motor on the car, so that there will be no necessity of stopping the car for the purpose of supplying or charging it with motive power.

The invention consists in the several improvements which I will now proceed to describe and claim.

Of the accompanying drawings, forming a part of this specification, Figure 1 represents a side elevation of a car and a power-supply station embodying my invention. Fig. 2 represents a top view of the same. Fig. 3 represents an end view. Fig. 4 represents a section on line 4 4, Fig. 2. Fig. 5 represents a section on line 5 5, Fig. 3.

The same letters of reference indicate the same parts in all the figures.

My invention includes the storage of motive power in a suitable storage-receptacle on a car by connecting said receptacle with a supply-station located beside the track while the car is in motion, there being a series of said supply-stations located at suitable points along the track, so that while the car is moving along its route its storage-receptacle will from time to time receive accretions or partial charges of motive power, which may be communicated in any suitable way to a motor on the car, the car being thus kept supplied with motive power without loss of time in charging or supplying its storage-receptacle.

My invention includes the use of electricity as the motive power, and when this agent is used the invention may be carried into effect by the means shown in my pending application for Letters Patent of the United States for improvements in electric-railway systems, filed December 5, 1890, Serial No. 373,664.

In the present case I have shown means for storing non-electric motive power of a fluid nature, such as compressed air or steam, and this branch of my invention I will now specifically describe.

$a$ represents a storage-receptacle located on a suitable part of a car $b$ and connected by a pipe $c$ with a motor $d$, which may be geared or otherwise connected with one or both axles of the car.

I have not devised any special form of motor, but may use either of many of the well-known forms adapted to be driven by compressed air, steam, &c., and in an electrical system by electricity.

At suitable points beside the track I provide power-supply stations, each of which is here shown as a tube or conduit $e$, extending vertically from the ground and having a horizontal branch $e'$ at its upper portion, to which is pivotally connected a swinging terminal $e^2$. The tube $e$, branch $e'$, and swinging terminal $e^2$ constitute a conduit adapted to convey a fluid motive power from a main conduit below the ground to a movable conduit $f$, connected with the storage-reservoir. The movable conduit $f$ is a flexible tube provided with a mouth-piece $f'$, which is adapted to receive the rearwardly-bent end of the terminal $e^2$, the form and construction of said mouth-piece and terminal being such that when the latter enters the former the two are connected, so that the motive power will flow from the supply-station to the reservoir $a$. The movable conduit $f$ is connected to a standard $h$ on a lazy-tongs $i$, mounted on the forward portion of the reservoir $a$ and adapted to be extended toward the rear of the car, thus permitting the stud $h$ and conduit $f$ to move in the same direction. A spring $j$, engaged with levers $i'$ $i'$ on the lazy-tongs normally contracts said lazy-tongs and holds the conduit $f$ normally at the forward end of the reservoir $a$. The swinging terminal $e^2$ of the supply-station is normally held in the position shown in Figs. 1, 2, and 3 by a spring $k$, and is adapted to yield from said position in the direction indicated by the arrow in Fig. 2. When the car in moving along its route reaches one of the supply-stations, the mouth $f'$ of conduit $f$ strikes the terminal $e^2$ of said station. The spring $k$ is sufficiently stiff to cause the terminal $e^2$ to arrest the mouth $f'$, the lazy-tongs spring $j$ yielding and permitting said lazy-tongs to extend and the mouth $f$ to remain at rest while the car moves on, so that the motive power flows into the reservoir $a$ until the lazy-tongs have reached the limit of their extension and exert a sufficient pull on the mouth $f'$ to cause the spring $k$ to yield and the terminal $e^2$ to swing aside and separate from the mouth $f'$. After this separation the lazy-tongs are contracted by the spring $j$ and restore the mouth $f'$ to the position shown in Figs. 1 and 2, said mouth being thus prepared to connect with the next station. The conduit $f$ is provided with an outwardly-closing valve $f^3$, Fig. 4, which has a stem $f^4$, arranged to be pressed inwardly to open said valve by the terminal $e^2$, the valve closing and retaining the pressure of the motive power in the reservoir $a$ when the terminal $e^2$ separates from the mouth $f'$. The terminal $e^2$ has a rotary valve $e^3$, having an arm $e^4$ arranged to be moved to turn the valve by contact with an elongated flange $a^2$ on the reservoir $a$, the arrangement being such that the flange $a^2$ strikes arm $e^4$ and opens valve $e^3$ just as the mouth $f'$ connects with terminal $e^2$, the valve remaining open until flange $a^2$ passes away from arm $e^4$, whereupon the valve is closed by a spring to prevent leakage from the supply-station after separation of the mouth $f'$ therefrom.

As already indicated, I include in the scope of the claims of this specification power-supply stations consisting of branches of a main electric circuit and a storage receptacle or reservoir consisting of a storage-battery on the car, as shown in my pending application, above referred to.

I claim—

1. The combination of a series of motive-power-supply stations or conduits arranged at suitable points along a railway or other track, each having an automatically-closing valve which normally prevents the escape of motive power, and each having a terminal yieldingly held in its normal position, a car having a motive-power-storage receptacle, a motor connected with said receptacle, a flexible spring-supported conduit connected with the receptacle and having its outer end formed and arranged to connect with the terminal of each supply-station and establish communication between such station and the storage-receptacle while the car is passing the station, the outer end of the said movable conduit being adapted to yield or move backwardly lengthwise of the car while in contact with each station, the terminal of each station yielding when the movable conduit has reached the end of its backward movement and then separating therefrom, means for automatically moving the conduit forward after it has separated from each station, means for automatically moving each terminal to its normal position after it has separated from the movable conduit, and a device on the car adapted to open the valve of the station and hold the same open so long as the movable conduit on the car remains in communication therewith, as set forth.

2. The combination of a series of motive-power-supply stations or conduits, each having a movable terminal yieldingly held in its normal position, a car having a motive-power-storage receptacle and a movable conduit connected therewith and yieldingly held in its normal position, said conduit being formed to connect with each station and having a limited movement lengthwise of the car, so that when the conduit first strikes a station it yields until it reaches the rearward extreme of its movement, the terminal of the station then yielding and separating from the conduit, after which both the terminal and the conduit are automatically returned to their normal positions, as set forth.

3. The combination of a series of motive-power-supply stations or conduits, each having an automatically-closed valve and a yieldingly-supported terminal, a car having a storage-receptacle, a flexible spring-supported conduit connected with said receptacle and adapted to register with the delivering-terminal of each station in succession and to yield lengthwise of the car when in contact with said delivering end, and a device on the car whereby the valve of each station is opened and held open during the connection of the conduit on the car with said station, as set forth.

4. The combination of a series of motive-power-supply stations or conduits, a car having a storage-receptacle, a movable conduit connected at one end to said receptacle and having its outer end formed and arranged to register with the delivering end of each station in succession, said conduit being movable lengthwise of the car, and a spring-closed lazy-tongs connected with the car and with the conduit, said lazy-tongs being adapted to extend toward the rear end of the car and permit the movement of the conduit in that direction while the conduit is engaged with a supply-station and to contract and carry the conduit forward when the conduit is disengaged from said station, as set forth.

In testimony whereof I have signed my name to this specification, in the presence of two subscribing witnesses, this 15th day of January, A. D. 1891.

LÉON O. DION.

Witnesses:
C. F. BROWN,
A. D. HARRISON.